United States Patent [19]

Pittinger, Jr.

[11] 4,035,915
[45] July 19, 1977

[54] FILAMENT WOUND PERFORATE PLATE SYSTEM

[76] Inventor: Charles B. Pittinger, Jr., 79 Maybin Circle, Baltimore, Md. 21117

[21] Appl. No.: 587,648

[22] Filed: June 17, 1975

[51] Int. Cl.² .................. B26B 27/00; A01D 55/18
[52] U.S. Cl. .................................. 30/347; 56/295
[58] Field of Search ............ 56/12.7, 10.4, 229, 56/249, 255, 289, 294, 295, DIG. 17; 30/347, 276, 264, 329, 115, 116, 117

[56] References Cited

U.S. PATENT DOCUMENTS

| 3,826,068 | 7/1974 | Ballas et al. | 56/12.7 |
| 3,895,440 | 7/1975 | Pittinger, Jr. | 56/12.7 |

*Primary Examiner*—J.N. Eskovitz
*Attorney, Agent, or Firm*—John F. McClellan, Sr.

[57] ABSTRACT

A filament-bearing plate or disk system for cutting grass and the like in which the filament is wound upon later-closed serrations in the disk periphery rather than passed through a succession of holes in the disk periphery; embodiments of the invention have respectively resilient, malleably deformable, and rotationally positionable aperture closing, and a ring closure.

18 Claims, 15 Drawing Figures

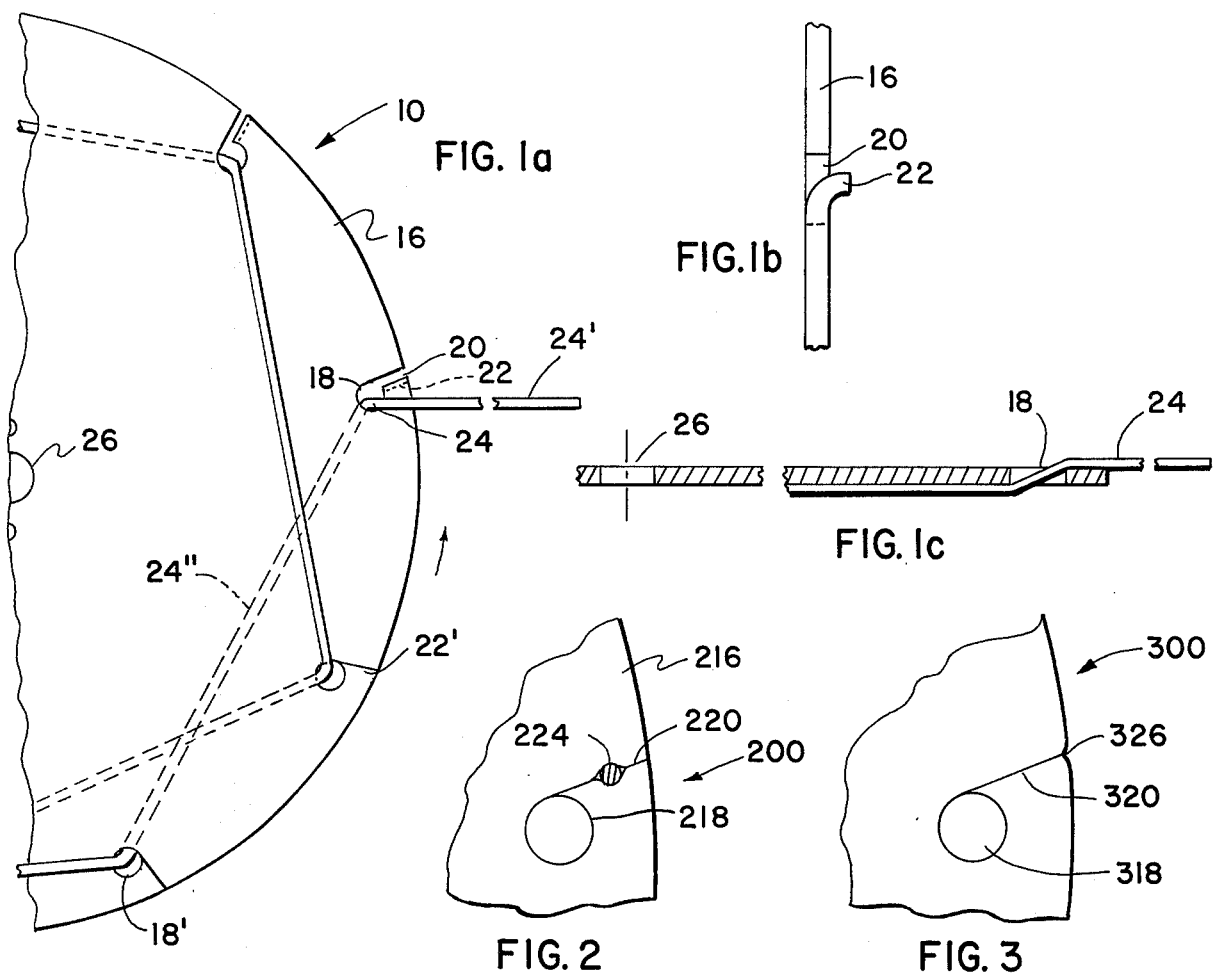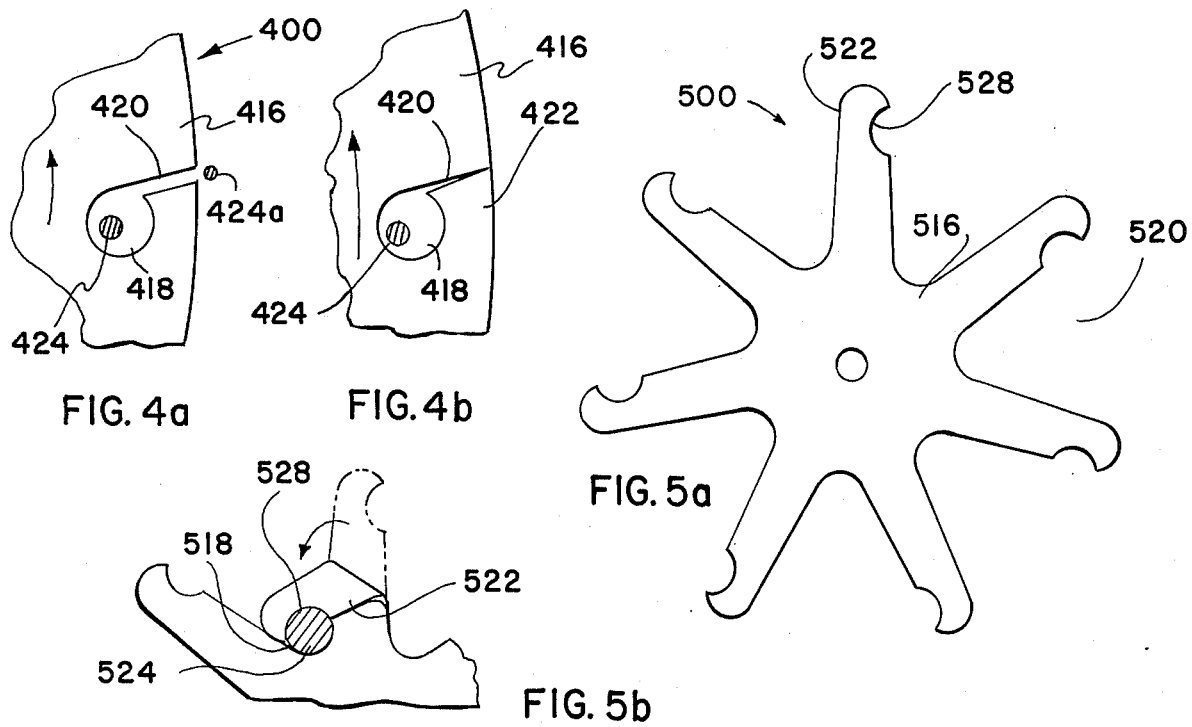

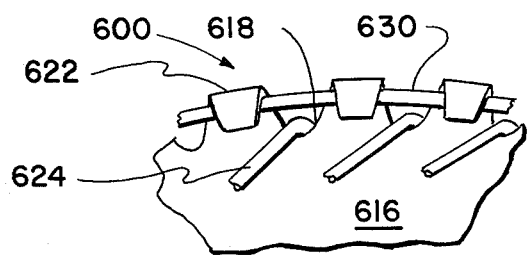
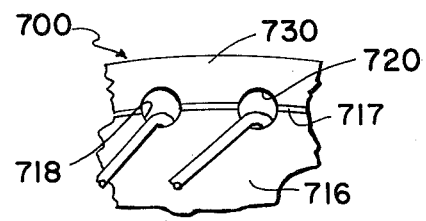
FIG. 6  FIG. 7
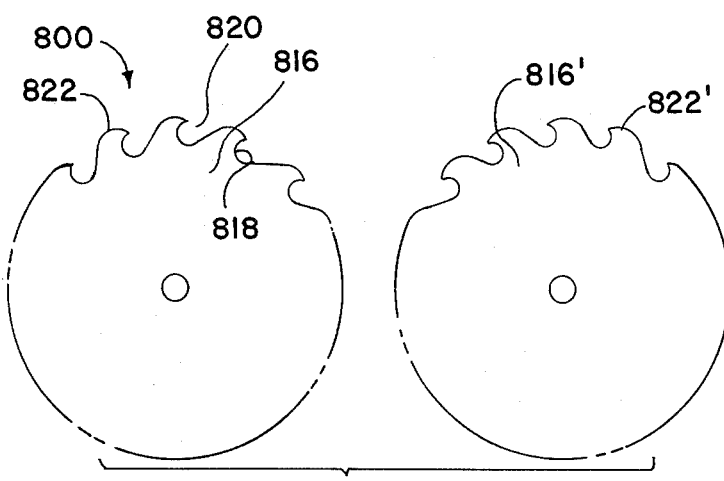
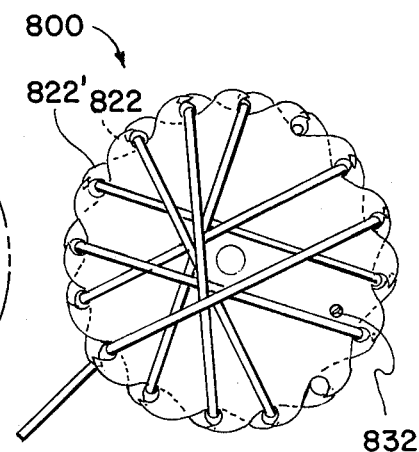
FIG. 8a  FIG. 8b
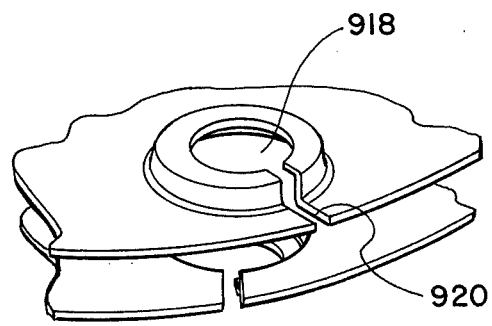
FIG. 9a
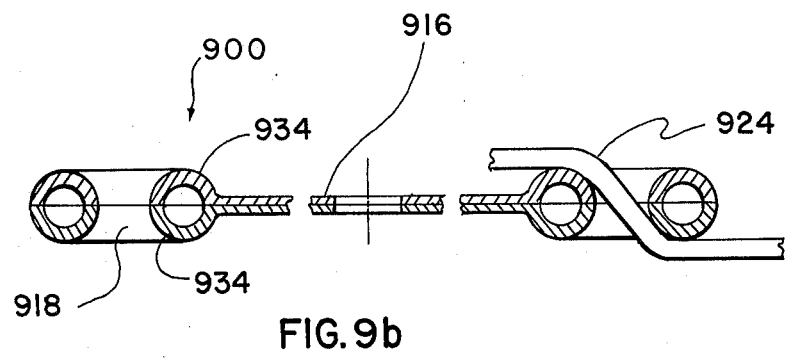
FIG. 9b

FILAMENT WOUND PERFORATE PLATE SYSTEM

Cross reference is made to my co-pending application for U.S. Pat., Ser. No. 514,560, now U.S. patent 3,895,440, issued July 22, 1975; filed Oct. 15, 1974, entitled DISK FOR FILAMENT TRIMMER now U.S. Pat. No. 3,895,440, issued July 22, 1975; and Ser. No. 514,561, now U.S. Pat. No. 3,928,911, issued Dec. 30, 1975 filed October 15, 1974, entitled HOLLOW-SHAFT FEED FILAMENT TRIMMER now U.S. Pat. No. 3,928,911, issued Dec. 30, 1975.

This invention relates generally to filament cutters for cutting grass and the like, and specifically to automatic filament-feed cutter heads of the type described.

My first-mentioned copending Application disclose a novel cutter head which swings a terminal length of filament as a cutter as it operationally rotates, and which upon parting of that terminal length of filament as result of wear or breakage during operation automatically deploys a replacement length, and so on, deploying additional lengths as needed.

Structure previously disclosed by me for the purpose includes a disk or plate with a circular series of perforations through which the filament is threaded in a predetermined serial mode.

A principal object of the present invention is to provide for faster mounting of filament in disk structure having filament wound over a serrated plate periphery, rather than threaded through holes.

Further objects are to provide for adjustment of aperture size and configuration to suit particular needs such as filament sizes.

The above advantages and objects of this invention will become more readily understood upon examination of the following description, including the Figures in which like reference numerals refer to like parts:

FIGS. 1a, 1b and 1c are respectively a top plan, a side elevation, and a radial section, showing fragmentary details of a first embodiment of the invention;

FIGS. 2 and 3 are top plan fragmentary details of a second and a third embodiment;

FIGS. 4a and 4b are top plan fragmentary details of a fourth embodiment and a variation thereon;

FIGS. 5a and 5b are respectively a top plan view of a fifth embodiment and a top plan fragmentary detail thereof at a later stage of manufacture.

FIG. 6 is a top plan of a fragment of a sixth embodiment;

FIG. 7 is a top plan view of a fragment of a seventh embodiment;

FIG. 8a and 8b are respectively an exploded view and a view assembled of an eighth embodiment; and FIGS. 9a and 9b are respectively an isometric fragmentary detail during assembly and a side elevation in section after assembly of a ninth embodiment.

Fig. 1a, 1b and 1c illustrate an embodiment 10, showing rim of a disk or plate 16 which has a plurality of apertures 18 or filament wine-over areas around the periphery, and a slot or opening 20 passing outward from the aperture through the periphery. An element movable to close the slot is provided as follows. A portion of the material, which may be mild steel, forms a bent tab 22 bounding the slot on one side. After an intermediate portion or bright of the filament 24 is wound broadside into the aperture or the broadside aspect passed radially with respect to the disk passes radially into the aperture, the tab is bent into the plane of the disk, effectively closing the aperture as at 22', forming a smooth periphery and preventing the terminal length of the filament 24', if adjacent, from passing radially out of the aperture on rotation of the disk about the center 26, when the terminal length will swing beyond the periphery as a cutting length. When wear and stress eventually part the filament at the aperture, a new terminal length 24" swings outward as the cutting length from another aperture 18' in accordance with principles set out in my above referenced prior disclosure.

FIG. 2 illustrates an embodiment 200 having a self-sealing slit 220 through the periphery into the aperture 218. Material of the disk 216 is chosen to be sufficiently resilient to pass the filament 224, shown in section, under winding pressure, resealing behind it. Polypropylene or other resilient material can be used for the purpose, and the slit can be heat sealed or welded after winding, if desired.

FIG. 3 shows an embodiment 300 similar to the preceding Figure except that the slit widens outwardly at the periphery of the disk, facilitating passing the filament into the aperture through the recess 326.

FIG. 4 a illustrates an embodiment 400 with a fixed-width slot 420 through the periphery of the disk 416 connecting with the aperture 418. Resiliently deformable filaments such as "Nylon" monofilament can be stretched or otherwise resiliently deformed to reduce the cross-section locally as at 424a, received in and passed through the slot which is made to be too narrow for the unstressed filament to pass, and then, when in the aperture, relaxed, so that the filament is prevented from passing outward through the slot by the restoration of full diameter as at 424.

FIG. 4b indicates that disk structure 416 similar to that of the preceding Figure can be bent in-plane at 422 to close the slot if desired, regardless of whether the slot is initially larger or smaller than the filament 424, and regardless of filament characteristics. Circularity of the aperture (preferred embodiment) contributes to low-stress in-plane bending of the disk structure.

In all the above embodiments, the opening through the periphery communicating with the aperture is preferably at an angle to a radius therethrough and tangential to the aperture. If the disk has a preferred direction of rotation (arrows) then the outward inclination of the opening is preferably in the direction of the preferred direction of rotation. These arrangements provide double assurance that the filament will be smoothly and positively retained under the variables of operation, since the filament is never aligned with the opening, but instead swings radially outward, or slightly behind the radial position, because of cutting resistance and air resistance. In either case the filament lies over a solid portion of the disk.

FIG. 5a illustrates a starfish-like disk structure 516 in a preliminary stage of manufacture. Each of the arms 522 has a lateral relief 528 corresponding to that of the other arms outward of the apertures, as part of the opening 520 between the arms. Material is preferably mild steel. Function of the arms is shown in the next Figure.

FIG. 5b indicates how the arms 522 of the preceding Figure can be inwardly bent or folded over themselves, toward the plane of the disk and laterally, overlapping and closing adjacent opening, with the contour of the relief 528 forming a continuation of the contour of the proximate aperture 518.

FIG. 6 illustrates an embodiment 600 somewhat similar to that of the previous Figure, but with the arm ends 622 being movable elements folded over a ring 630, holding the ring concentric with the disk center, and capturing the filament 624 in the apertures 618. The ring may be held in place by welding. A ring on each side of the disk may also be supplied.

FIG. 7 illustrates an embodiment 700 with a ring 730 having recesses 720 in the inner circumference corresponding to the disk apertures 718 so that they together form closed contoured apertures. The ring and the disk may be welded or cemented to unite the ring with the circumference of the disk, which it fits, as at 717.

FIG. 8 illustrates an embodiment 800 in which the disk 816 has a separated periphery on which the filament is wound. The teeth 822 are formed by inclined openings 820 through the periphery connecting with the apertures 818. Following winding, a matching movable element 816', which may be an identical disk reversed and coaxially mounted so that the teeth 822' incline in the opposite direction, is moved relative to the disk, such as by relative rotation, so that the teeth close the openings outwardly of the apertures.

FIG. 8b shows the finished result. Restringing or rewinding is easily accomplished by loosening the shaft nut, clamp, or any other common fastening device 832 which may be employed to hold the relative position of the parts, and rewinding the disk, following which the co-acting element is again assembled.

Size of the apertures is adjustable for various size filaments to an extent depending on to what degree the coaxial parts are rotated relative to each other.

FIGS. 9a and 9b show an embodiment 900 similar to that of the preceding Figure, in which identical disks have apertures surrounded by pressed or cast integral hemi-toroidal structure 934 through which openings 920 through the periphery pass at an angle to radii passing therethrough. The openings may be radial to the apertures (but not to the disks 916) as shown. In any case the openings are narrow relative to the diameters of the apertures and the openings between apertures so that when the plates are placed face-to-face, filaments cannot be strung because they cannot pass through the openings which, being inclined to the disk radius, cannot be congruent even through the apertures are congruent. This requires axial separation of the disks for stringing and winding access to the apertures 918. The toroidal structure on assembly of the plates or disks forms a continuously curved structure for the filament 924.

Obviously many modifications and variations of the present invention are possible in light of the above teachings. It is, therefore, to be understood that within the scope of the appended claims the invention may be practiced otherwise than as specifically described.

What is claimed and desired to be protected by the United States letters patent is:

1. In an assembly for cutting grass and the like, including an operationally rotatable disk having structure defining a series of apertures circumferentially around the disk inside the circumference and a length of filament fixed to the disk with a terminal length thereof extending from one of said apertures as a cutting length of the filament and plural of the apertures engaging successive intermediate portions of the filament at intervals providing for each said successive intermediate portion of the filament in turn to become a said terminal length thereof extending as a cutting length on parting of a previous said terminal length thereof during operational rotation of said disk, the improvement comprising: the disk having structure defining means extending from said apertures to the circumference for receiving the broadside aspect of an intermediate length of the filament radially with respect to the disk into at least one aperture to the disk during assembly, and means communicating with said broadside aspect of the filament for preventing said intermediate length of the filament from passing radially with respect to the disk from said aperture on operational rotation of the disk.

2. In an assembly as recited in claim 1, the means for receiving comprising the disk having structure defining a slit through the periphery thereof, the slit being at an angle to a radius of the disk therethrough, and connecting with a side of said aperture.

3. In an assembly as recited in claim 2, the disk having a preferred direction of operational rotation, and the slit angle outwardly inclining toward the preferred direction of operational rotation.

4. In an assembly for cutting grass and the like, including an operationally rotatable disk having a series of apertures circumferentially therearound with a length of filament fixed to the disk and having a terminal length thereof extending from one of said apertures as a cutting length of the filament, with plural of the apertures engaging successive intermediate portions of the filament at intervals providing for eash said successive intermediate portion of the filament in turn to become a said terminal length thereof extending as a cutting length on parting of a previous said terminal length thereof during operational rotation of said disk, the improvement comprising: means for receiving an intermediate length of the filament radially into at least one aperture of the disk during assembly, means for preventing said intermediate length of the filament from passing radially from said aperture on operational rotation of the disk, the means for receiving comprising the disk having structure defining a slit through the periphery of the disk connecting with said aperture, and the means for preventing comprising the structure defining the slit being sufficiently resiliently yielding for permitting passage of the filament through the slit and for closure thereafter.

5. In an assembly as recited in claim 4, the slit widening outwardly toward the outer end thereof, forming a recess for facilitating engagement of the filament with the slit.

6. In an assembly for cutting grass and the like, including an operationally rotatable disk having a series of apertures circumferentially therearound with a length of filament fixed to the disk and having a terminal length thereof extending from one of said apertures as a cutting length of the filament, with plural of the apertures engaging successive intermediate portions of the filament at intervals providing for each said successive intermediate portion of the filament in turn to become a said terminal length thereof extending as a cutting length on parting of a previous said terminal length thereof during operational rotation of said disk, the improvement comprising: means for receiving an intermediate length of the filament radially into at least one aperture of the disk during assembly, means for preventing said intermediate length of the filament from passing radially from said aperture on operational rotation of the disk, said filament being resiliently deformable to reduce the cross section thereof while under stress, the means for receiving comprising the disk having a slit through the periphery thereof connecting with the aperture, the slit being wider than a cross section of the filament when the filament is resiliently deformed to reduce the cross section thereof while under said stress, and the means for preventing comprising said cross section of the filament being wider than the slit when the filament is not under said stress, whereby the filament can be stressed and inserted through the aperture and thereafter relaxed for preventing the filament from passing radially from said aperture.

7. In an assembly for cutting grass and the like, including an operationally rotatable disk having a series of apertures circumferentially therearound with a length of filament fixed to the disk and having a terminal length thereof extending from one of said apertures as a cutting length of the filament, with plural of the apertures engaging successive intermediate portions of the filament at intervals providing for each said successive intermediate portion of the filament in turn to become a said terminal length thereof extending as a cutting length on parting of a previous said terminal length thereof during operational rotation of said disk, the improvement comprising: means for receiving an intermediate length of the filament radially into at least one aperture of the disk during assembly, means for preventing said intermediate length of the filament from passing radially from said aperture on opertional rotation of the disk, the means for receiving comprising structure defining an opening in the disk periphery connecting with the aperture, and the means for preventing comprising an element movable to close said opening in the disk periphery after placement of the filament in the aperture.

8. In an assembly as recited in claim 7, said element comprising a bendable element engaging a portion of the disk.

9. In an assembly as recited in claim 8, said bendable element being structure forming a side of said an opening.

10. In an assembly as recited in claim 9, a direction of said bending being toward the plane of the disk.

11. In an assembly as recited in claim 9, the direction of said bending being in the plane of said disk.

12. In an assembly as recited in claim 8, and a circular member retained proximately around the periphery of the disk by said bendable element.

13. In an assembly as recited in claim 7, said movable element comprising a member movable relative to the disk substantially about the center of rotation of the disk.

14. In an assembly as recited in claim 13, said opening in the disk being inclined relative to a radius of the disk passing therethrough, and the movable element having a similar opening oppositely inclined.

15. In an assembly as recited in claim 14, the movable element having an aperture like the disk aperture and the respective openings in the disk and movable element being respectively smaller than the apertures, whereby the disk and movable element must be axially separated for the filament to pass through disk and movable element apertures 16. In an assembly as recited in claim 15, the disk structure proximately around the disk aperture having a hemi-toroidal shape, and the movable element structure proximately around the movable element aperture having a complementary hemi-toroidal shape, thereby providing for forming a continously curved structure for the filament when the disk and movable element are assembled together axially with all said apertures congruent.

17. In an assembly as recited in claim 7, the movable element comprising an arcuate member for installation proximately around the periphery of the disk radially outward of the aperture, and means for securing the arcuate member in place.

18. In an assembly as recited in claim 17, the arcuate member having therein at least one recess complementary in shape and location to said at least one aperture, forming therewith a closed contoured aperture.

* * * * *